(12) United States Patent
Tanaka et al.

(10) Patent No.: US 6,579,645 B2
(45) Date of Patent: Jun. 17, 2003

(54) HYDROGEN ABSORBING ALLOY FOR ELECTRODE, HYDROGEN ABSORBING ALLOY ELECTRODE AND ALKALINE STORAGE BATTERY

(75) Inventors: Tadayoshi Tanaka, Takatsuki (JP); Yasuyuki Harada, Naruto (JP); Katsuhiko Shinyama, Higashi-Osaka (JP); Yoshinori Matsuura, Kasai (JP); Reizo Maeda, Kasai (JP); Toshiyuki Nohma, Hirakata (JP); Ikuo Yonezu, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 33 days.

(21) Appl. No.: 09/817,792

(22) Filed: Mar. 27, 2001

(65) Prior Publication Data
US 2002/0009641 A1 Jan. 24, 2002

(30) Foreign Application Priority Data

Mar. 28, 2000 (JP) .......................................... 2000-089065
Jun. 22, 2000 (JP) .......................................... 2000-187191

(51) Int. Cl.⁷ ............................................... H01M 4/62
(52) U.S. Cl. .................... 429/218.2; 429/232; 429/233; 429/217
(58) Field of Search ............................ 429/218.2, 233, 429/232, 217

(56) References Cited

U.S. PATENT DOCUMENTS

| 5,874,168 A | 2/1999 | Kiyokawa et al. |
| 6,387,148 B1 * | 5/2002 | Nakano et al. ........... 429/218.2 |

FOREIGN PATENT DOCUMENTS

| JP | 61-163569 | 7/1986 |
| JP | 61-185863 | 8/1986 |
| JP | 63-266767 | 11/1988 |
| JP | 5-159798 | 6/1993 |
| JP | 9-106817 | 4/1997 |

OTHER PUBLICATIONS

The machine translation of JP 5–159798.*

* cited by examiner

*Primary Examiner*—Laura Weiner
(74) *Attorney, Agent, or Firm*—Armstrong, Westerman, Hattori, LLP

(57) ABSTRACT

In a hydrogen absorbing alloy electrode employed as a negative electrode of an alkaline storage battery, a covering layer containing at least one of metal elected from nickel and cobalt, and carbon particles is formed on a surface of the hydrogen absorbing alloy electrode or hydrogen absorbing alloy particles used in the hydrogen absorbing alloy electrode.

21 Claims, 1 Drawing Sheet

HYDROGEN ABSORBING ALLOY FOR ELECTRODE, HYDROGEN ABSORBING ALLOY ELECTRODE AND ALKALINE STORAGE BATTERY

BACKGROUND OF THE INVENTION

1. Field of the Invention

The present invention relates generally to an alkaline storage battery like a nickel-metal hydride battery, a hydrogen absorbing alloy electrode used as a negative electrode of the alkaline storage battery, and a hydrogen absorbing alloy used as the hydrogen absorbing alloy electrode, and is particularly characterized in that the hydrogen absorbing alloy for electrode used as the hydrogen absorbing alloy electrode and hydrogen absorbing alloy electrode are modified to improve high-rate discharge performance and charge and discharge cycle performance in the alkaline storage battery.

2. Description of the Related Art

A nickel-metal hydride battery has been conventionally known as one of alkaline storage batteries. Such a nickel-metal hydride battery has generally employed as its negative electrode a hydrogen absorbing alloy electrode.

As such a hydrogen absorbing alloy electrode for the alkaline storage battery, the one obtained by applying a paste prepared by mixing hydrogen absorbing alloy powder and a binding agent to a current collector and then drying the paste thereon has been generally utilized.

However, in the alkaline storage battery wherein the hydrogen absorbing alloy electrode as described above are used, the conductivity in the hydrogen absorbing alloy electrode is insufficient, thus charge and discharge performance at a high current is inferior. Further, the surface of the hydrogen absorbing alloy in the hydrogen absorbing alloy electrode is oxidized and deteriorated by the oxygen that appears in the positive electrode when the battery is overcharged, thus a discharge capacity is decreased gradually, and charge and discharge cycle performance is degraded.

Therefore, in Japanese Patent Laid-Open No. Shou61 (1986)-163569, plating the surface of the hydrogen absorbing alloy powder with nickel or nickel alloy to improve the conductivity of hydrogen absorbing alloy powder and adhesion of the hydrogen absorbing alloy powder to the current collector has been proposed. In Japanese Patent Laid-Open No. Shou61(1986)-185863, covering the surface of the hydrogen absorbing alloy particles with carbon to prevent the oxidation of the hydrogen absorbing alloy by the oxygen that appears in the positive electrode when the battery is overcharged has been proposed. In Japanese Patent Laid-Open No. Shou63(1988)-266767, forming a porous conductive layer containing nickel and the like on the surface of the hydrogen absorbing alloy electrode to improve the conductivity of the hydrogen absorbing alloy electrode and prevent the oxidation of the hydrogen absorbing alloy in the hydrogen absorbing alloy electrode by the oxygen that appears in the positive electrode when the battery is overcharged has been proposed. In Japanese Patent Laid-Open No. Hei5 (1993)-159798 and Japanese Patent Laid-Open No. Hei9 (1997)-106817, plating the surface of the hydrogen absorbing alloy powder with metal containing particulates of water-repellent resin or fluorine compound to improve the conductivity of the hydrogen absorbing alloy powder and the adhesion of the hydrogen absorbing alloy powder to the current collector has been proposed.

Unfortunately however, even when the surface of the hydrogen absorbing alloy powder is plated with the nickel or nickel alloy, or the porous conductive layer containing the nickel and the like is formed on the surface of the hydrogen absorbing alloy electrode as mentioned above, the oxidation of the surface of the hydrogen absorbing alloy in the hydrogen absorbing alloy electrode by the oxygen that appears in the positive electrode when the battery is overcharged is not prevented fully, and the charge and discharge cycle performance is not fully improved.

There remain problems that the conductivity of the hydrogen absorbing alloy electrode is decreased, and the charge and discharge performance at a high current is degraded in a case where the surface of hydrogen absorbing alloy particles is covered with carbon as mentioned above.

There still remain problems that in a part where the above-mentioned water-repellent resin or fluorine compound exists, a contact between alkaline electrolyte solution and the hydrogen absorbing alloy powder is insufficient, charge and discharge reactivity in the hydrogen absorbing alloy electrode is decreased, and the discharge performance and the charge and discharge cycle performance at a high current is degraded in the case where the surface of the hydrogen absorbing alloy particles is plated with the metal containing water-repellent resin or fluorine compound as mentioned above.

SUMMARY OF THE INVENTION

An object of the present invention is to solve the above-mentioned problems in an alkaline storage battery wherein a hydrogen absorbing alloy electrode is employed as its negative electrode.

A first object of the present invention is to modify a hydrogen absorbing alloy for electrode and the hydrogen absorbing alloy electrode, to improve conductivity of the hydrogen absorbing alloy electrode.

A second object of the present invention is to modify the hydrogen absorbing alloy for electrode and the hydrogen absorbing alloy electrode, to prevent fully the hydrogen absorbing alloy from oxidation by oxygen that appears in a positive electrode when the battery is overcharged.

A third object of the present invention is to prevent hydrogen absorbing alloy particles from falling away from a current collector in the hydrogen absorbing alloy electrode wherein an electrode material using the hydrogen absorbing alloy particles is adhered to the current collector.

A fourth object of the present invention is to improve a high-rate discharge performance and a charge and discharge cycle performance in the alkaline storage battery wherein the hydrogen absorbing alloy electrode is employed as its negative electrode.

A first hydrogen absorbing alloy for electrode according to the present invention is a hydrogen absorbing alloy for electrode containing hydrogen absorbing alloy particles, wherein a covering layer containing at least one of metal elected from nickel and cobalt, and carbon particles is formed on a surface of said hydrogen absorbing alloy particles.

The conductivity of the hydrogen absorbing alloy electrode is improved by at least one of the metal elected from the nickel and the cobalt in the covering layer formed on the surface of the hydrogen absorbing alloy particles when the hydrogen absorbing alloy electrode using the first hydrogen absorbing alloy is employed as the negative electrode of the alkaline storage battery. Further, the oxidation of the hydrogen absorbing alloy in the hydrogen absorbing alloy electrode is prevented by the carbon particles in the covering layer even in the case where the oxygen appears in the positive electrode when the battery is overcharged.

The high-rate discharge performance and the charge and discharge cycle performance of the alkaline storage battery are improved as the conductivity of the hydrogen absorbing alloy electrode is improved and the oxidation of the hydrogen absorbing alloy in the hydrogen absorbing alloy electrode by oxygen that appears in the positive electrode when the battery is overcharged is prevented as mentioned above.

In forming the covering layer containing at least one of the metal elected from the nickel and cobalt, and the carbon particles on the surface of the hydrogen absorbing alloy particles as mentioned above, various ways can be adopted. However, to form easily the covering layer without decrease of the performance of the hydrogen absorbing alloy, the covering layer is preferably formed by plating, and more preferably by electroless plating.

In forming the covering layer containing at least one of the metal elected from the nickel and cobalt, and the carbon particles on the surface of the hydrogen absorbing alloy particles as mentioned above, when the thickness of the above-mentioned metal part in the covering layer is too thin, the conductivity of the hydrogen absorbing alloy electrode is not fully improved. On the other hand, when the thickness of the metal part is too thick, a whole surface of the hydrogen absorbing alloy particles is covered and a charge and discharge reactivity is decreased. Therefore, an average thickness of the metal part in the covering layer is preferably set in the range of 0.5 to 2.5 $\mu$m.

Further, to prevent fully the oxidation by the oxygen that appears in the positive electrode when the battery is overcharged of the hydrogen absorbing alloy in the hydrogen absorbing alloy electrode by the carbon particles in the covering layer, the carbon particles whose average particle diameter is not less than the average thickness of the metal part in the covering layer are preferably used, and more preferably the carbon particles whose average particle diameter is larger than the average thickness of the metal part in the covering layer.

Further, in forming the above-mentioned covering layer on the surface of the hydrogen absorbing alloy particles, when the amount of the carbon particles in the covering layer is too small, the oxidation of the hydrogen absorbing alloy in the hydrogen absorbing alloy electrode by the oxygen that appears in the positive electrode when the battery is overcharged is not fully prevented. On the other hand, when the amount of the carbon particles in the covering layer is too large, the conductivity of the hydrogen absorbing alloy electrode is decreased, and the charge and discharge performance at a high current is degraded. Therefore, the amount of the carbon particles in the covering layer is preferably set in the range of 0.5 to 5.0 wt %.

A first hydrogen absorbing alloy electrode according to the present invention is a hydrogen absorbing alloy electrode in which an electrode material containing hydrogen absorbing alloy particles is adhered to a current collector, wherein a covering layer containing at least one of metal elected from nickel and cobalt, and carbon particles is formed on a surface of said hydrogen absorbing alloy particles.

When the first hydrogen absorbing alloy electrode is employed as the negative electrode of the alkaline storage battery, the conductivity of the hydrogen absorbing alloy electrode is improved by at least one of the metal elected from the nickel and cobalt in the covering layer formed on the surface. Further, the oxidation of the hydrogen absorbing alloy in the hydrogen absorbing alloy electrode is prevented by the carbon particles in the covering layer even in the case where the oxygen appears in the positive electrode when the battery is overcharged.

The high-rate discharge performance and the charge and discharge cycle performance of the alkaline storage battery are improved as the conductivity of the hydrogen absorbing alloy electrode is improved and the oxidation of the hydrogen absorbing alloy in the hydrogen absorbing alloy electrode by oxygen that appears in the positive electrode when the battery is overcharged is prevented as mentioned above.

In the first hydrogen absorbing alloy electrode, in forming the covering layer containing at least one of the metal elected from the nickel and cobalt, and the carbon particles on the surface, various ways can be adopted. However, to form easily the covering layer without the decrease of the performance of the hydrogen absorbing alloy, the covering layer is preferably formed by the plating, and more preferably by the electroless plating.

In forming the covering layer containing at least one of the metal elected from the nickel and cobalt, and the carbon particles, when the thickness of the above-mentioned metal part in the covering layer is too thin, the conductivity of the hydrogen absorbing alloy electrode is not fully improved. On the other hand, when the thickness of the metal part is too thick, the whole surface of the hydrogen absorbing alloy electrode is covered and the charge and discharge reactivity is decreased. Therefore, the average thickness of the metal part in the covering layer is preferably set in the range of 0.5 to 5.0 $\mu$m.

Further, when the amount of the carbon particles in the above-mentioned covering layer is too small, the oxidation of the hydrogen absorbing alloy in the hydrogen absorbing alloy electrode by the oxygen that appears in the positive electrode when the battery is overcharged is not fully prevented. On the other hand, when the amount of the carbon particles in the covering layer is too large, the conductivity of the hydrogen absorbing alloy electrode is decreased, and the charge and discharge performance at a high current is degraded. Therefore, the amount of the carbon particles in the film layer is preferably set in the range of 0.5 to 5.0 wt %.

A second hydrogen absorbing alloy for electrode according to the present invention is a hydrogen absorbing alloy for electrode containing hydrogen absorbing alloy particles, wherein a covering layer containing at least one of metal elected from nickel and cobalt, and hydrophilic polymer is formed on a surface of said hydrogen absorbing alloy particles.

The conductivity of the hydrogen absorbing alloy electrode is improved, the contact between alkaline electrolyte solution and the hydrogen absorbing alloy particles is sufficient through the hydrophilic polymer in the covering layer, and the charge and discharge reactivity in the hydrogen absorbing alloy electrode is sufficient by at least one of the metal elected from the nickel and cobalt in the covering layer formed on the surface of the hydrogen absorbing alloy particles when the hydrogen absorbing alloy electrode using the second hydrogen absorbing alloy for electrode is employed as the negative electrode of the alkaline storage battery.

The high-rate discharge performance and the charge and discharge cycle performance of the alkaline storage battery are improved as the conductivity of the hydrogen absorbing alloy electrode is improved and the charge and discharge reactivity in the hydrogen absorbing alloy electrode is sufficient.

In the hydrogen absorbing alloy electrode wherein the second hydrogen absorbing alloy for electrode is adhered to the current collector, the adhesion of the hydrogen absorbing alloy particles to the current collector is improved and the hydrogen absorbing alloy particles are prevented from falling away from the current collector by the above-mentioned hydrophilic polymer contained in the covering layer.

In the second hydrogen absorbing alloy for electrode, in forming the covering layer containing at least one of the metal elected from the nickel and cobalt, and the hydrophilic polymer on the surface, when the thickness of the metal part of the metal elected from at least one of the nickel and cobalt in the covering layer is too thin, the conductivity of the hydrogen absorbing alloy electrode is not fully improved. On the other hand, when the thickness of the metal part is too thick, the whole surface of the hydrogen absorbing alloy particles is covered and the charge and discharge reactivity is decreased. Therefore, the average thickness of the above-mentioned metal part in the covering layer is preferably set in the range of 0.5 to 2.5 $\mu$m.

Further, in forming the above-mentioned covering layer on the surface of the hydrogen absorbing alloy particles, when the amount of the hydrophilic polymer in the covering layer is too small, the adhesion of the hydrogen absorbing alloy particles to the current collector is degraded and the part where the alkaline electrolyte solution contacts with the hydrogen absorbing alloy particles through the hydrophilic polymer is decreased. On the other hand, when the amount of the hydrophilic polymer is too large, the oxidation of the hydrogen absorbing alloy particles is not sufficiently prevented. Therefore, the amount of the hydrophilic polymer in the covering layer is preferably set in the range of 0.5 to 5 wt %.

As the above-mentioned hydrophilic polymer, well-known hydrophilic polymer including hydrophilic functional group such as an ether group, a carboxy group, an aldehyde group, a ketone group, a hydroxyl group, a sulfonic acid group, an amino group, a diazo group can be employed. Examples of such hydrophilic polymer include polyethylene oxide, polyvinyl alcohol, polyvinyl pyrrolidone, polyacrylamide, polyacrylic acid, polymethacrylate, and copolymer of these, and the like.

A second hydrogen absorbing alloy electrode according to the present invention is a hydrogen absorbing alloy electrode in which an electrode material containing hydrogen absorbing alloy particles is adhered to a current collector, wherein a covering layer containing at least one of metal elected from nickel and cobalt, and hydrophilic polymer is formed on a surface of said current collector.

When the second hydrogen absorbing alloy electrode is employed as the negative electrode of the alkaline storage battery, the conductivity of the hydrogen absorbing alloy electrode is improved by at least one of the metal elected from nickel and cobalt in the covering layer formed on the surface. Further, the adhesion of the hydrogen absorbing alloy particles to the current collector is improved by the hydrophilic polymer contained in the covering layer and the hydrogen absorbing alloy particles are prevented from falling away from the current collector.

As the above-mentioned hydrophilic polymer, the hydrophilic polymer employed in the case of the above-mentioned second hydrogen absorbing alloy for electrode can be employed.

In the second hydrogen absorbing alloy electrode, when the hydrogen absorbing alloy particles wherein the covering layer containing at least one of the metal elected from the nickel and cobalt, and the hydrophilic polymer is formed on the surface is employed as the above-mentioned hydrogen absorbing alloy particles, the conductivity of the hydrogen absorbing alloy particles is further improved by at least one of the metal elected from the nickel and cobalt contained in each of the covering layers formed on the surfaces of the current collector and hydrogen absorbing alloy particles, the adhesion of the hydrogen absorbing alloy particles to the current collector is further improved and the hydrogen absorbing alloy particles are further prevented from falling away from the current collector by the hydrophilic polymer contained in each of the covering layers.

In the above-mentioned second hydrogen absorbing alloy for electrode and second hydrogen absorbing alloy electrode, in forming the covering layer containing at least one of the nickel and cobalt, and the hydrophilic polymer on the surfaces of the hydrogen absorbing alloy particles and the current collector, the covering layer can be formed by plating the surfaces of the hydrogen absorbing alloy particles and the current collector dispersing the above-mentioned hydrophilic polymer in plating fluid containing the nickel and cobalt, and in plating, it is preferable to adopt electroless plating which is simple of handling.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
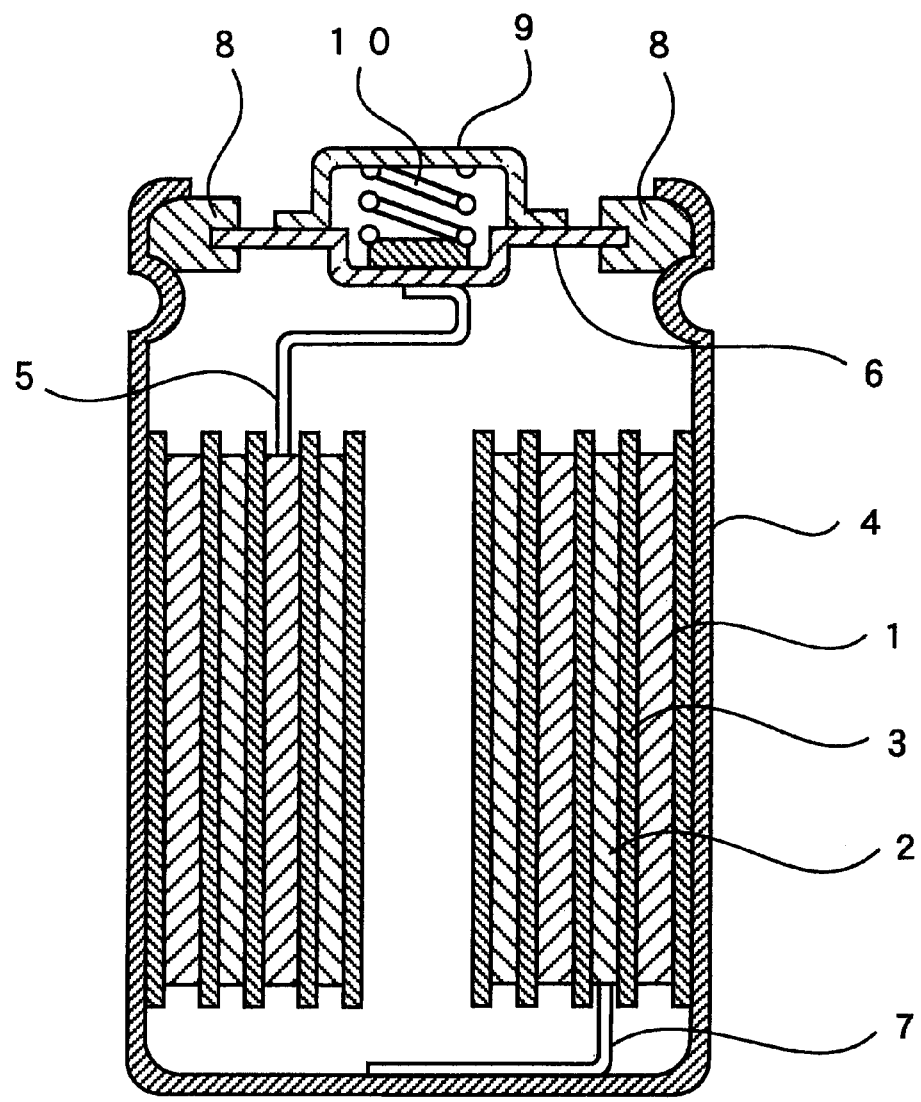
FIG. 1 is a schematic sectional view of each of alkaline storage batteries fabricated in examples and comparative examples of the present invention.

The following examples specifically illustrate a hydrogen absorbing alloy for electrode, a hydrogen absorbing alloy electrode and an alkaline storage battery. Further, comparative examples will be taken to make it clear that in each of the alkaline storage battery according to the examples, internal pressure is prevented form rising, internal resistance is decreased, and a charge and discharge cycle performance is improved. It should be appreciated that the hydrogen absorbing alloy for electrode, the hydrogen absorbing alloy electrode and the alkaline storage battery are not particularly limited to those in the following examples, and various changes and modifications may be made in the invention without departing from the spirit and scope thereof.

EXAMPLE A1

In the example A1, hydrogen absorbing alloy powder represented by a constitutional formula of $MmNi_{3.2}Co_{1.0}Al_{0.6}Mn_{0.2}$ and having an average particle diameter of about 50 $\mu$m was used. In the hydrogen absorbing alloy powder, a misch metal represented by Mm is in the weight ratio of La:Ce:Pr:Nd=25:50:6:19.

In the example A1, the above-mentioned hydrogen absorbing alloy powder was immersed for 6 minutes in plating fluid wherein the temperature was 60° C., adjusted to pH 7 by ammonium hydroxide $NH_4OH$, and containing 30 g of nickel sulfate, 34 g of malonic sodium, 30 g of boric acid, 30 g of ammonium chloride, 3.4 g of dimethylamine borane, 0.2 g of natural graphite powder having the average particle diameter of 3 $\mu$m, and 0.4 g of polyoxyethylene alkyl ether as surface-active agent per liter for electroless plating and a covering layer containing nickel and natural graphite powder was formed on the surface of the above-mentioned hydrogen absorbing alloy particles.

As the above-mentioned natural graphite powder, the natural graphite powder which is a mechanically ground natural graphite ingot ($d_{002}$=33.56 nm; Lc>10000 nm) and prepared to have the average particle diameter of 3 μm was employed. The average particle diameter of the natural graphite powder was measured by particle size distribution through laser diffraction.

The weight of the covering layer to the weight of the hydrogen absorbing alloy before the covering layer was formed was about 12 wt %, an average thickness of a nickel part in the covering layer was about 1.0 μm, and a weight ratio of the natural graphite powder in the covering layer was about 3.5 wt %.

The average thickness of the nickel part was measured to observe the section of the hydrogen absorbing alloy particles by means of SEM. In measuring the weight ratio of the natural graphite powder in the covering layer, the hydrogen absorbing alloy powder wherein the covering layer was formed was removed from the plating fluid, and the weight of the natural graphite powder in the covering layer was calculated based on the amount of the natural graphite powder added and the amount of the natural graphite powder left in the plating fluid. In the previously mentioned conditions, the weight ratio of the natural graphite powder in the covering layer was calculated.

Then, 1.0 part by weight of polyethylene oxide as a binding agent and a little water were mixed with 100 parts by weight of the hydrogen absorbing alloy powder wherein the covering layer containing the nickel and the natural graphite powder was formed on the surface to prepare a paste, and the paste thus obtained was applied uniformly to both surfaces of the current collector using a punching metal, followed by drying. The current collector having the paste applied thereto was then rolled, to obtain a hydrogen absorbing alloy electrode.

The hydrogen absorbing alloy electrode thus fabricated was employed as a negative electrode to fabricate an alkaline storage battery having a battery capacity of about 1 Ah which was in a shape of a cylinder as shown in FIG. 1.

Each of the alkaline storage batteries employed as its positive electrode a sintered type nickel electrode fabricated by chemically impregnating a sintered nickel substrate having a porosity of 85% with a nickel nitrate aqueous solution having cobalt sulfate and zinc nitrate added thereto, as a separator a non-woven fabric having alkaline resistance, and as an alkaline electrolyte solution an aqueous solution of 30 wt % potassium hydroxide.

In fabricating the alkaline storage battery, the separator 3 was interposed between the positive electrode 1 and the negative electrode 2 and was spirally wound, was contained in a negative electrode can 4, and was then sealed by pouring the alkaline electrolyte solution into the negative electrode can 4, as shown in FIG. 1. Subsequently, the positive electrode 1 was connected to a sealing cover 6 through a positive electrode lead 5 while the negative electrode 2 was connected to the negative electrode can 4 through a negative electrode lead 7. The negative electrode can 4 and the sealing cover 6 were electrically insulated from each other by an insulating packing 8, and a coil spring 10 was provided between the sealing cover 6 and a positive electrode external terminal 9. When the internal pressure of the battery abnormally rose, the coil spring 10 was compressed, so that gas inside the battery was released in the air.

Example A2

In the example A2, the same hydrogen absorbing alloy powder represented by the constitutional formula of $MmNi_{3.2}Co_{1.0}Al_{0.6}Mn_{0.2}$ and having an average particle diameter of about 50 μm, as that in the above-mentioned example A1, was used.

In the example A2, in forming the covering layer on the surface of the above-mentioned hydrogen absorbing alloy powder, the above-mentioned hydrogen absorbing alloy powder was immersed for 4 minutes in the plating fluid wherein the temperature was 90° C., adjusted to pH 9 by ammonium hydroxide $NH_4OH$, and containing 15 g of cobalt sulfate, 115 g of sodium tartrate, 30 g of boric acid, 21 g of sodium hypophosphite, 0.2 g of natural graphite powder having the average particle diameter of 3 μm, and 0.4 g of the polyoxyethylene alkyl ether as the surface-active agent per liter for electroless plating and the covering layer containing the cobalt and the natural graphite powder was formed on the surface of the above-mentioned hydrogen absorbing alloy particles.

The weight of the covering layer to the weight of the hydrogen absorbing alloy powder before the covering layer was formed was about 12 wt %, the average thickness of a cobalt part in the covering layer was about 1.0 μm, and the weight ratio of the natural graphite powder in the covering layer was about 3.5 wt %.

Except that the hydrogen absorbing alloy powder wherein the covering layer containing the cobalt and the natural graphite powder was formed on the surface was employed, the hydrogen absorbing alloy electrode was fabricated in the same manner as above-mentioned example A1. The alkaline storage battery in the example A2 having the battery capacity of about 1 Ah which was in the shape of the cylinder was fabricated employing as its negative electrode the hydrogen absorbing alloy electrode thus fabricated.

Comparative Example a1

In the comparative example a1, the same hydrogen absorbing alloy powder represented by the constitutional formula of $MmNi_{3.2}Co_{1.0}Al_{0.6}Mn_{0.2}$ and having the average particle diameter of about 50 μm as that in the above-mentioned example A1 was used.

In the comparative example a1, in forming the covering layer on the surface of the above-mentioned hydrogen absorbing alloy powder, the natural graphite powder having the average particle diameter of 3 μm was not added to the plating fluid adopted in the above-mentioned example A1. Except for the above, the same procedure as the above-mentioned example A1 was taken to form the covering layer composed of the nickel on the surface of the above-mentioned hydrogen absorbing alloy particles.

The weight of the covering layer composed of the nickel to the weight of the hydrogen absorbing alloy before the covering layer was formed was about 12 wt %, and the average thickness of the covering layer composed of the nickel was about 1.0 μm.

Except that the hydrogen absorbing alloy powder wherein the covering layer composed of the nickel was formed on the surface was employed, the hydrogen absorbing alloy electrode was fabricated in the same manner as the above-mentioned example A1. The alkaline storage battery in the comparative example a1 having the battery capacity of about 1 Ah which was in the shape of the cylinder was fabricated employing as its negative electrode the hydrogen absorbing alloy electrode thus fabricated.

Comparative Example a2

In the comparative example a2, the same hydrogen absorbing alloy powder represented by the constitutional formula of $MmNi_{3.2}Co_{1.0}Al_{0.6}Mn_{0.2}$ and having the average particle diameter of about 50 µm as that in the above-mentioned example A1 was used.

In the comparative example a2, in forming the covering layer on the surface of the above-mentioned hydrogen absorbing alloy powder, the natural graphite powder having the average particle diameter of 3 µm was not added to the plating fluid used in the above-mentioned example A2. Except for the above, the same procedure as that in the above-mentioned example A2 was taken to fabricate the covering layer composed of the cobalt on the surface of the above-mentioned hydrogen absorbing alloy particles.

The weight of the covering layer composed of the cobalt to the weight of the hydrogen absorbing alloy before the covering layer was formed was about 12 wt %, and the average thickness of the covering layer composed of the cobalt was about 1.0 µm.

Except that the hydrogen absorbing alloy powder wherein the covering layer composed of the cobalt was formed on the surface was employed, the hydrogen absorbing alloy electrode was fabricated in the same manner as the above-mentioned example A1. The alkaline storage battery in the comparative example a2 having the battery capacity of about 1 Ah which was in the shape of the cylinder was fabricated employing as its negative electrode the hydrogen absorbing alloy electrode thus fabricated.

Comparative Example a3

In the comparative example a3, the same hydrogen absorbing alloy powder represented by the constitutional formula of $MmNi_{3.2}Co_{1.0}Al_{0.6}Mn_{0.2}$ and having the average particle diameter of about 50 µm as that in the above-mentioned example A1 was used.

In the example a3, the above-mentioned hydrogen absorbing alloy powder was immersed in a water solution containing 60% of sucrose followed by dry distillation at 400° C. in a nitrogen atmosphere to obtain the hydrogen absorbing alloy powder wherein the covering layer composed of carbon was formed on the surface.

Except that the hydrogen absorbing alloy powder wherein the covering layer composed of the carbon was formed on the surface was employed, the hydrogen absorbing alloy electrode was fabricated in the same manner as the above-mentioned example A1. The alkaline storage battery in the comparative example a3 having the battery capacity of about 1 Ah which was in the shape of the cylinder was fabricated employing as its negative electrode the hydrogen absorbing alloy electrode thus fabricated.

Comparative Example a4

In the comparative example a4, the same hydrogen absorbing alloy powder represented by the constitutional formula of $MmNi_{3.2}Co_{1.0}Al_{0.6}Mn_{0.2}$ and having the average particle diameter of about 50 µm as that in the above-mentioned example A1 was used. Except that the covering layer was not formed on the surface of the hydrogen absorbing alloy powder and the hydrogen absorbing alloy powder was directly used, the hydrogen absorbing alloy electrode was fabricated in the same manner as the above-mentioned example A1. The alkaline storage battery in the comparative example a4 having the battery capacity of about 1 Ah which was in the shape of the cylinder was fabricated employing as its negative electrode the hydrogen absorbing alloy electrode thus fabricated.

Each of the alkaline storage batteries according to the above-mentioned examples A1 to A2 and comparative examples a1 to a4 thus fabricated was charged at the current of 0.1 A for 1.5 hours, and was then discharged at the current of 0.2 A to a voltage of 1.0 V. A chain of this experiment was repeated once again so that each of the alkaline storage batteries of examples A1 to A2 and comparative examples a1 to a4 was activated.

Subsequently, each of the alkaline storage batteries of examples A1 to A2 and comparative examples a1 to a4 thus activated was charged for 1.5 hour at the current of 1.0 A, and an internal pressure was measured. The results were shown in the following Table 1. The internal pressure was measured in a condition that the internal gas of the batteries would not be released in the air, each of the batteries were provided with holes, and a pressure sensor was inserted into the holes.

Then each of the alkaline storage batteries in the examples A1 to A2 and comparative examples a1 to a4 thus activated was charged to 50% of the capacity at the current of 0.5 A was then left for 20 minutes, and then was discharged at the current of 0.5 A for a minute, was left for 20 minutes at room temperature. Subsequently, each of the alkaline storage batteries was charged at the current of 0.5 A for a minute, was left for 20 minutes, and then was discharged at a current of 1 A for a minute, was left for 20 minutes, and thereafter, was charged at a current of 1 A for a minute, was left for 20 minutes. Then, in the same way as mentioned above, each of the alkaline storage batteries was charged and discharged at the current of 2A and 3 A for a minute respectively, and the voltage at 10th second in the condition that each batteries was discharged at the current of 0.5 A, 1 A, 2 A, 3 A was measured. Subsequently, based on an inclination of straight lines of each current at a time of discharge and each voltages measured, the internal resistance of each alkaline storage batteries was measured. The results were shown in the following Table 1.

Further, each of the activated alkaline storage batteries according to the above-mentioned examples A1 to A2 and comparative examples a1 to a4 was charged at the current of 0.1 A for 12 hours and was then discharged at a current of 0.2 A to a discharge end voltage of 1.0 V. Charge and discharge was carried out repeatedly with the above-mentioned charge and discharge taken as one cycle so as to regard the number of the cycle times until the discharge capacity of each batteries rose up to 60% of the initial capacity of the activated alkaline storage batteries as cycle life.

TABLE 1

| | Material of covering layer | Internal pressure (kg/cm$^2$) | Internal resistance (mΩ) | Cycle life (Number of times) |
|---|---|---|---|---|
| Example A1 | nickel + natural graphite | 11.8 | 22.0 | 812 |
| Example A2 | cobalt + natural graphite | 11.7 | 22.4 | 704 |
| Comparative Example a1 | nickel | 17.2 | 23.8 | 591 |
| Comparative Example a2 | cobalt | 17.3 | 23.4 | 547 |

TABLE 1-continued

|  | Material of covering layer | Internal pressure (kg/cm$^2$) | Internal resistance (mΩ) | Cycle life (Number of times) |
|---|---|---|---|---|
| Comparative Example a3 | carbon material | 16.2 | 27.5 | 590 |
| Comparative Example a4 | — | 16.8 | 26.0 | 478 |

As apparent from the results, in each of the alkaline storage batteries in the examples A1 to A2 employing as the negative electrode of the hydrogen absorbing alloy electrode the hydrogen absorbing alloy powder wherein the covering layer containing the nickel or cobalt, and the natural graphite powder which was the carbon particles was formed on the surface, the internal pressure and the internal resistance were remarkably decreased, and the cycle life was remarkably improved compared with each of the alkaline storage batteries in comparative examples a1 to a2 employing as its negative electrode of the hydrogen absorbing alloy electrode the hydrogen absorbing alloy powder wherein the covering layer composed of nickel or cobalt was formed on the surface, the alkaline storage battery in the comparative example a3 employing as its negative electrode of the hydrogen absorbing alloy electrode the hydrogen absorbing alloy powder wherein the covering layer composed of the carbon is formed on the surface, and the alkaline storage battery in the comparative example a4 employing as its negative electrode of the hydrogen absorbing alloy electrode the hydrogen absorbing alloy powder wherein the covering layer was not formed. Especially, in the case of the alkaline storage battery in the example A1 wherein the nickel was employed as the metal in the covering layer, the cycle life was further improved compared with the alkaline storage battery in the example A2 wherein the cobalt was employed as the metal in the covering layer.

Examples A1.1 to A1.6

In the examples A1.1 to A1.6, the same hydrogen absorbing alloy powder represented by the constitutional formula of $MmNi_{3.2}Co_{1.0}Al_{0.6}Mn_{0.2}$ and having the average particle diameter of about 50 μm as that in the above-mentioned example A1 was used. The covering layer containing the nickel and the natural graphite powder was formed on the surface of the hydrogen absorbing alloy powder by the electroless plating.

In the examples A1.1 to A 1.6, in forming the covering layer containing the nickel and the natural graphite powder on the surface of the hydrogen absorbing alloy powder, the time to immerse the hydrogen absorbing alloy powder in the plating fluid adopted in the example A1 was changed. Specifically, the immersion time was respectively set to 1 minute 48 seconds in the example A1.1; 3 minutes 00 second in the example A1.2; 9 minutes 00 second in the example A1.3; 12 minutes 00 second in the example A1.4; 15 minutes 00 second in the example A1.5; 16 minutes 12 seconds in the example A1.6.

The average thickness of the nickel part in each of the covering layers measured in the same way as the example A1 was respectively 0.3 μm in the example A1.1; 0.5 μm in the example A1.2; 1.5 μm in the example A1.3; 2.0 μm in the example A1.4; 2.5 μm in the example A1.5; 2.7 μm in the example A1.6 as shown in the following Table 2.

Except that the hydrogen absorbing alloy powder wherein each of the above-mentioned covering layers containing the nickel and the natural graphite powder was formed on the surface was employed, the hydrogen absorbing alloy electrode was fabricated in the same manner as the above-mentioned example A1. The alkaline storage batteries in the examples A1.1 to A1.6 having the battery capacity of about 1 Ah which were in the shape of a cylinder were fabricated employing as the negative electrode the hydrogen absorbing alloy electrode thus fabricated.

With respect to the alkaline storage batteries in the examples A1.1 to A1.6, the internal pressure, the internal resistance and the cycle life were measured in the same manner as the above-mentioned example A1. The results were shown in the following Table 2.

TABLE 2

|  | Average thickness of nickel part (μm) | Internal pressure (kg/cm$^2$) | Internal resistance (mΩ) | Cycle life (Number of times) |
|---|---|---|---|---|
| Example A1.1 | 0.3 | 12.5 | 22.5 | 648 |
| Example A1.2 | 0.5 | 12.0 | 22.0 | 698 |
| Example A1 | 1.0 | 11.8 | 22.0 | 812 |
| Example A1.3 | 1.5 | 12.0 | 21.9 | 806 |
| Example A1.4 | 2.0 | 12.2 | 22.1 | 808 |
| Example A1.5 | 2.5 | 13.0 | 22.2 | 805 |
| Example A1.6 | 2.7 | 14.0 | 23.0 | 803 |

As a result, the cycle life of each of the alkaline storage batteries in the examples A1 and A1.2 to A1.5 wherein the average thickness of the nickel part in the covering layer was in the range of 0.5 μm to 2.5 μm was improved compared with the alkaline storage battery in the example A1.1 wherein the average thickness of the nickel part in the covering layer was 0.3 μm, and the internal pressure and the internal resistance of the batteries were decreased compared with the alkaline storage battery in the example A1.6 wherein the average thickness of the nickel part in the covering layer was 2.7 μm.

Especially in the case of the alkaline storage batteries in the example A1, A1.3, and A1.4 wherein the average thickness of the nickel part in the covering layer was in the range of 1.0 μm to 2.0 μm, the cycle life was further improved and the internal pressure and the internal resistance of the batteries were further decreased.

Examples A1.7 to A1.11

In the examples A1.7 to A1.11, the same hydrogen absorbing alloy powder represented by the constitutional formula of $MmNi_{3.2}Co_{1.0}Al_{0.6}Mn_{0.2}$ and having the average particle diameter of about 50 μm as that in the above-mentioned example A1 was used. The covering layer containing the nickel and the natural graphite powder was formed on the surface of the hydrogen absorbing alloy powder by the electroless plating.

In the examples A1.7 to A 1.11, in forming the covering layer containing the nickel and the natural graphite powder on the surface of the hydrogen absorbing alloy powder, the amount of the natural graphite powder having the average particle diameter of 3 μm added to the plating fluid adopted in the above-mentioned example A1 was changed. Specifically, the amount of the natural graphite powder in the plating fluid per liter was respectively set to 0.02 g in the example A1.7; 0.05 g in the example A1.8; 0.15 g in the example A1.9; 0.40 g in the example A1.10; 0.50 g in the example A1.11.

The weight ratio of the natural graphite powder in each of the covering layers thus formed which was measured in the same manner as the example A1 was respectively 0.2 wt % in the example A1.7; 0.5 wt % in the example A1.8; 2.0 wt % in the example A1.9; 5.0 wt % in the example A1.10; 5.5 wt % in the example A1.11 as shown in the following Table 3.

Except that the above-mentioned hydrogen absorbing alloy powder wherein each of the covering layers containing the nickel and the natural graphite powder was formed on the surface was employed, the hydrogen absorbing alloy electrode was fabricated in the same manner as the above-mentioned example A1. The alkaline storage batteries in the examples A1.7 to A1.11 having the battery capacity of about 1 Ah which were in the shape of the cylinder were fabricated employing as the negative electrode the hydrogen absorbing alloy electrode thus fabricated.

With respect to the alkaline storage batteries in the examples A1.7 to A1.11 thus fabricated, the internal pressure, the internal resistance and the cycle life were measured in the same manner as in the case of the above-mentioned example A1. The results were shown in the following Table 3.

TABLE 3

| | Amount of natural graphite in covering layer (wt %) | Internal pressure (kg/cm$^2$) | Internal resistance (mΩ) | Cycle life (Number of times) |
|---|---|---|---|---|
| Example A1.7 | 0.2 | 14.5 | 22.2 | 753 |
| Example A1.8 | 0.5 | 13.0 | 21.8 | 805 |
| Example A1.9 | 2.0 | 12.0 | 21.8 | 807 |
| Example A1 | 3.5 | 11.8 | 22.0 | 812 |
| Example A1.10 | 5.0 | 11.5 | 22.5 | 752 |
| Example A1.11 | 5.5 | 12.0 | 22.8 | 601 |

As the result, the internal pressure of the each of the alkaline storage batteries in the examples A1 and A1.8 to A1.10 wherein the weight ratio of the carbon particles composed of the natural graphite powder in the covering layer was in the range of 0.5 wt % to 5.0 wt % was decreased compared with the alkaline storage battery in the example A1.7 wherein the weight ratio of the carbon particles composed of the natural graphite powder in the covering layer was 0.2 wt %, and the cycle life of each of the alkaline storage batteries was increased compared with the alkaline storage battery in the example A1.11 wherein the weight ratio of the carbon particles composed of the natural graphite powder in the covering layer was 5.5 wt %.

Especially in the case of the alkaline storage batteries in the example A1 and A1.9 wherein the weight ratio of the carbon particles composed of the natural graphite powder in the covering layer was in the range of 2.0 wt % to 3.5 wt%, the cycle life was further improved and the internal pressure and the internal resistance were further decreased.

Examples A1.12 to A1.17

In the examples A1.12 to A1.17, the same hydrogen absorbing alloy powder represented by the constitutional formula of $MmNi_{3.2}Co_{1.0}Al_{0.6}Mn_{0.2}$ and having the average particle diameter of about 50 μm as that in the above-mentioned example A1, was used. The covering layer containing the nickel and the natural graphite powder was formed on the surface of the hydrogen absorbing alloy powder by the electroless plating.

In the examples A1.12 to A 1.17, in forming the covering layer containing the nickel and the natural graphite powder on the surface of the hydrogen absorbing alloy powder, the average thickness of nickel part in the covering layer was respectively set to 1.5 μm in the examples A1.12 and A1.13 as the above-mentioned example A1.3; 2.0 μm in the examples A1.14 and A1.15 as the above-mentioned example A1.4; 2.5 μm in the examples A1.16 and 1.17 as the above-mentioned example A1.5 as shown in the Table 4.

As the above-mentioned natural graphite powder, the natural graphite powder having the average particle diameter of 1.0 μm in the examples A1.12 and A1.14, 1.5 μm in the example A1.13, 2.0 μm in the examples A1.5 and A1.16, 2.5 μm in the example A1.17 was respectively employed as shown in the Table 4.

Except that each of the hydrogen absorbing alloy powder wherein the each of the covering layers containing the above-mentioned nickel and the natural graphite powder was formed on the surface was employed, the hydrogen absorbing alloy electrode was fabricated in the same manner as the above-mentioned example A1. The alkaline storage batteries in the examples A1.12 to A1.17 having the battery capacity of about 1 Ah which were in the shape of the cylinder were fabricated employing as the negative electrode the hydrogen absorbing alloy electrode thus fabricated.

With respect to the alkaline storage batteries in the examples A1.12 to A1.17, the internal pressure, the internal resistance and the cycle life were measured in the same manner as the above-mentioned example A1. The results were shown in the following Table 4.

TABLE 4

| | Average thickness of nickel layer | Average particle diameter of natural graphite | Internal pressure (kg/cm$^2$) | Internal resistance (mΩ) | Cycle life (Number of times) |
|---|---|---|---|---|---|
| Example A1.12 | 1.5 μm | 1.0 μm | 14.8 | 22.5 | 601 |
| Example A1.13 | 1.5 μm | 1.5 μm | 13.1 | 21.5 | 762 |
| Example A1.3 | 1.5 μm | 3.0 μm | 12.0 | 21.9 | 806 |
| Example A1.14 | 2.0 μm | 1.0 μm | 15.0 | 22.8 | 598 |
| Example A1.15 | 2.0 μm | 2.0 μm | 13.0 | 21.8 | 751 |
| Example A1.4 | 2.0 μm | 3.0 μm | 12.2 | 22.1 | 808 |
| Example A1.16 | 2.5 μm | 2.0 μm | 15.6 | 22.9 | 599 |
| Example A1.17 | 2.5 μm | 2.5 μm | 13.9 | 22.0 | 755 |
| Example A1.5 | 2.5 μm | 3.0 μm | 13.0 | 22.2 | 805 |

As the result, in each of the alkaline storage batteries in the examples A1.3 to A1.5, A13, A1.15, and A1.17 wherein the average particle diameter of the natural graphite powder in the covering layer was larger than the average thickness of the nickel part in the covering layer, the internal pressure and the internal resistance were decreased and the cycle life was increased compared with each of the alkaline storage batteries in the examples A1.12, A1.14 and A1.16 wherein the average particle diameter of the natural graphite powder in the covering layer was smaller than the average thickness of the nickel part in the covering layer.

Especially in the case of the alkaline storage batteries in the examples A1.3 to A1.5 wherein the average particle diameter of the natural graphite powder in the covering layer was larger than the average thickness of the nickel part in the covering layer, the cycle life was further improved and the internal pressure and the internal resistance of the batteries were further decreased.

Example B1

In the examples B1, the same hydrogen absorbing alloy powder represented by the constitutional formula of $MmNi_{3.2}Co_{1.0}Al_{0.6}Mn_{0.2}$ and having the average particle diameter of about 50 μm as that in the above-mentioned example $A_1$ was used.

Then, in the example B1, 0.5 part by weight of the copolymer of styrene-methacrylic acid ester and 0.5 part by weight of the polyethylene oxide as the binding agent and a little water were mixed with 100 parts by weight of the hydrogen absorbing alloy powder to prepare a paste, and the paste thus obtained was applied uniformly to both surfaces of the current collector composed of the punching metal plated with nickel, followed by drying. The current collector having the paste applied thereto was then rolled, to obtain a hydrogen absorbing alloy electrode.

The hydrogen absorbing alloy electrode thus fabricated was immersed for 6 minutes in the same plating fluid as that in the above-mentioned example A1 wherein the temperature was 60° C., adjusted to pH 7 by the ammonium hydroxide $NH_4OH$, and containing 30 g of the nickel sulfate, 34 g of the malonic sodium, 30 g of the boric acid, 30 g of the ammonium chloride, 3.4 g of the dimethylamine borane, 0.2 g of the natural graphite powder having the average particle diameter of 3 μm, and 0.4 g of the polyoxyethylene alkyl ether as the surface-active agent per liter for the electroless plating and the covering layer containing the nickel and the natural graphite powder was formed on the surface of the above-mentioned hydrogen absorbing alloy electrode.

The average thickness of the nickel part in the covering layer was about 1.0 μm, and the weight ratio of the natural graphite powder in the covering layer was about 3.5 wt %.

Except that the hydrogen absorbing alloy electrode wherein the covering layer containing the nickel and the natural graphite powder was formed on the surface was employed as the negative electrode, the alkaline storage battery in the example B1 having the battery capacity of about 1 Ah which was in the shape of the cylinder was fabricated in the same manner as the above-mentioned example A1.

Example B2

In the examples B2, the same hydrogen absorbing alloy powder represented by the constitutional formula of $MmNi_{3.2}Co_{1.0}Al_{0.6}Mn_{0.2}$ and having the average particle diameter of about 50 μm as that in the above-mentioned example A1 was used.

Then, in the example B2, 0.5 part by weight of the copolymer of styrene-methacrylic acid ester and 0.5 part by weight of the polyethylene oxide as the binding agent and a little water were mixed with 100 parts by weight of the hydrogen absorbing alloy powder to prepare the paste, and the paste thus obtained was applied uniformly to both surfaces of the current collector composed of the punching metal plated with the nickel, followed by drying. The current collector having the paste applied thereto was then rolled, to obtain the hydrogen absorbing alloy electrode in the same manneras in the above-mentioned example B1.

The hydrogen absorbing alloy electrode thus fabricated was immersed for 4 minutes in the same plating fluid as that in the above-mentioned example A2 wherein the temperature was 90° C., adjusted to pH 9 by the ammonium hydroxide $NH_4OH$, and containing 15 g of cobalt sulfate, 115 g of sodium tartrate, 30 g of the boric acid, 21 g of sodium hypophosphite, 0.2 g of the natural graphite powder having the average particle diameter of 3 μm, and 0.4 g of the polyoxyethylene alkyl ether as the surface-active agent per liter for the electroless plating and the covering layer containing the cobalt and the natural graphite powder was formed on the surface of the above-mentioned hydrogen absorbing alloy electrode.

The average thickness of the cobalt part in the covering layer was about 1.0 μm, and the weight ratio of the natural graphite powder in the covering layer was about 3.5 wt %.

Except that the hydrogen absorbing alloy electrode wherein the covering layer containing the cobalt and the natural graphite powder was formed on the surface was employed as the negative electrode, the alkaline storage battery in the examples B2 having the battery capacity of about 1 Ah which was in the shape of the cylinder was fabricated as in the above-mentioned example A1.

Comparative Example b1

In the comparative example b1, the same hydrogen absorbing alloy powder represented by the constitutional formula of $MmNi_{3.2}Co_{1.0}Al0.6Mn_{0.2}$ and having the average particle diameter of about 50 μm as that in the above-mentioned example A1 was used.

Then, in the example b1, 0.5 part by weight of the copolymer of styrene-methacrylic acid ester and 0.5 part by weight of the polyethylene oxide as the binding agent and a little water were mixed with 100 parts by weight of the hydrogen absorbing alloy powder to prepare the paste, and the paste thus obtained was applied uniformly to both surfaces of the current collector composed of the punching metal plated with the nickel, followed by drying. The current collector having the paste applied thereto was then rolled, to obtain the hydrogen absorbing alloy electrode in the same manner as the above-mentioned example B1.

In forming the covering layer on the surface of the hydrogen absorbing alloy electrode, the natural graphite powder having the average particle diameter of 3 μm was not added to the plating fluid adopted in the above-mentioned example B1. Except for the above, the same procedure as the above-mentioned example B1 was taken to form the covering layer composed of the nickel on the surface of the hydrogen absorbing alloy electrode. The average thickness of the covering layer composed of the nickel was about 1.0 μm.

Except that the hydrogen absorbing alloy electrode wherein the covering layer composed of the nickel was formed on the surface was employed as the negative electrode, the alkaline storage battery in the comparative example b1 having the battery capacity of about 1 Ah which was in the shape of a cylinder was fabricated.

Comparative Example b2

In the comparative example b2, the same hydrogen absorbing alloy powder represented by the constitutional formula of $MmNi_{3.2}Co_{1.0}Al_{0.6}Mn_{0.2}$ and having the average particle diameter of about 50 μm, as that in the above-mentioned example A1, was used.

Then, in the example b2, 0.5 part by weight of the copolymer of styrene-methacrylic acid ester and 0.5 part by weight of the polyethylene oxide as the binding agent and a little water were mixed with 100 parts by weight of the hydrogen absorbing alloy powder to prepare the paste, and the paste thus obtained was applied uniformly to both surfaces of the current collector composed of the punching metal plated with nickel, followed by drying. The current collector having the paste applied thereto was then rolled, to obtain the hydrogen absorbing alloy electrode in the same manner as the above-mentioned example B1.

In forming the covering layer on the surface of the hydrogen absorbing alloy electrode thus fabricated, the natural graphite powder having the average particle diameter of 3 $\mu$m was not added to the plating fluid adopted in the above-mentioned example B2. Except for the above, the same procedure as the above-mentioned example B2 was taken to form the covering layer composed of the cobalt on the surface of the hydrogen absorbing alloy electrode. The average thickness of the covering layer composed of the cobalt was about 1.0 $\mu$m.

Except that the hydrogen absorbing alloy electrode wherein the covering layer composed of the cobalt was formed on the surface was employed as the negative electrode, the alkaline storage battery in the comparative example b2 having the battery capacity of about 1 Ah which was in the shape of the cylinder was fabricated.

Comparative Example b3

In the comparative example b3, the same hydrogen absorbing alloy powder represented by the constitutional formula of $MmNi_{3.2}Co_{1.0}Al_{0.6}Mn_{0.2}$ and having the average particle diameter of about 50 $\mu$m as that in the above-mentioned example A1, was used.

Then, in the example b3, 0.5 part by weight of the copolymer of styrene-methacrylic acid ester and 0.5 part by weight of the polyethylene oxide as the binding agent and a little water were mixed with 100 parts by weight of the hydrogen absorbing alloy powder to prepare the paste, and the paste thus obtained was applied uniformly to both surfaces of the current collector composed of the punching metal plated with nickel, followed by drying. The current collector having the paste applied thereto was then rolled, to obtain the hydrogen absorbing alloy electrode in the same manner as the above-mentioned example B1.

In the comparative example b3, the covering layer was not formed on the surface of the hydrogen absorbing alloy electrode thus fabricated and the hydrogen absorbing alloy electrode was directly employed as the negative electrode. Except for the above, the alkaline storage battery in the comparative example b3 having the battery capacity of about 1 Ah which was in the shape of the cylinder was fabricated in the same manner as the above-mentioned example A1.

With respect to each of the alkaline storage batteries in the examples B1 to B2 and comparative examples b1 to b3, the internal pressure, the internal resistance and the cycle life were measured in the same manner as that in the above-mentioned example A1. The results were shown in the following Table 5.

TABLE 5

| | Material of covering layer | Internal pressure (kg/cm$^2$) | Internal resistance (m$\Omega$) | Cycle life (number of times) |
|---|---|---|---|---|
| Example B1 | nickel + natural graphite | 11.5 | 21.9 | 820 |
| Example B2 | cobalt + natural graphite | 11.6 | 22.2 | 718 |
| Comparative example b1 | nickel | 15.8 | 24.1 | 595 |
| Comparative example b2 | cobalt | 15.9 | 24.2 | 570 |
| Comparative example b3 | — | 16.8 | 26.0 | 478 |

As apparent from the results, in each of the alkaline storage batteries in the examples B1 to B2 employing as the negative electrode the hydrogen absorbing alloy electrode wherein the covering layer containing the nickel or cobalt, and the natural graphite powder which was the carbon particles was formed on the surface, the internal pressure and the internal resistance were remarkably decreased, and the cycle life was remarkably improved compared with each of the alkaline storage batteries in comparative examples b1 to b2 employing as the negative electrode the hydrogen absorbing alloy electrode wherein the covering layer composed of the nickel or cobalt was formed on the surface, and the alkaline storage battery in comparative examples b3 employing as the negative electrode the hydrogen absorbing alloy electrode wherein the covering layer was not formed. Especially, in the case of the alkaline storage battery in the example B1 wherein the nickel was used as the metal in the covering layer, the internal pressure and the internal resistance were further decreased, and the cycle life was further improved compared with the alkaline storage battery in the example B2 wherein the cobalt was employed as the metal in the covering layer.

Examples B1.1 to B1.7

In the examples B1.1 to B1.7, in forming the covering layer containing the nickel and the natural graphite powder on the surface of the hydrogen absorbing alloy electrode by the electroless plating in the same manner as the above-mentioned example B1, the time to immerse the hydrogen absorbing alloy electrode in the plating fluid adopted in the example B1 was changed. Specifically, in immersing the hydrogen absorbing alloy electrode in the plating fluid adopted in the example B1, the immersion time was respectively set to 1 minute 48 seconds in the example B1.1; 3 minutes 00 second in the example B1.2; 12 minutes 00 second in the example B1.3; 18 minutes 00 second in the example B1.4; 24 minutes 00 second in the example B1.5; 30 minutes 00 second in the example B1.6; 33 minutes 00 second in the example B1.7.

The average thickness of the nickel part in each of the covering layers was respectively 0.3 $\mu$m in the example B1.1; 0.5 $\mu$m in the example B1.2; 2.0 $\mu$m in the example B1.3; 3.0 $\mu$m in the example B1.4; 4.0 $\mu$m in the example B1.5; 5.0 $\mu$m in the example B1.6; 5.5 $\mu$m in the example B1.7.

Except that each of the hydrogen absorbing alloy electrodes wherein each of the above-mentioned covering layers containing the nickel and the natural graphite powder were formed on the surface were employed as the negative electrode, the alkaline storage batteries in the examples B1.1 to B1.7 having the battery capacity of about 1 Ah which were in the shape of a cylinder were fabricated in the same manner as the above-mentioned example A1.

With respect to the alkaline storage batteries in the examples B1.1 to B1.7, the internal pressure, the internal resistance and the cycle life were measured in the same manner as that in the above-mentioned example A1. The results were shown in the following Table 6.

TABLE 6

|  | Average thickness of nickel part ($\mu$m) | Internal pressure (kg/cm$^2$) | Internal resistance (m$\Omega$) | Cycle life (Number of times) |
|---|---|---|---|---|
| Example B1.1 | 0.3 | 14.0 | 23.7 | 680 |
| Example B1.2 | 0.5 | 12.8 | 23.0 | 740 |
| Example B1 | 1.0 | 11.5 | 21.9 | 820 |
| Example B1.3 | 2.0 | 11.9 | 21.8 | 815 |
| Example B1.4 | 3.0 | 12.2 | 22.0 | 816 |
| Example B1.5 | 4.0 | 12.4 | 22.2 | 801 |
| Example B1.6 | 5.0 | 12.8 | 22.6 | 785 |
| Example B1.7 | 5.5 | 13.5 | 23.4 | 720 |

As the result, in each of the alkaline storage batteries in the examples B1 and B1.2 to B1.6 wherein the average thickness of the nickel part in the covering layer was in the range of 0.5 $\mu$m to 5.0 $\mu$m, the internal pressure and the internal resistance were decreased and the cycle life was improved compared with the alkaline storage batteries in the example B1.1 and example B1.7 wherein the average thickness of the nickel part in the covering layer was respectively 0.3 $\mu$m and 5.5 $\mu$m.

Especially in the alkaline storage batteries in the examples B1, B1.3 to B1.5 wherein the average thickness of the nickel part in the covering layer was in the range of 1.0 $\mu$m to 4.0 $\mu$m, the internal pressure and the internal resistance were further decreased and the cycle life was further improved.

Examples B1.8 to B 1.12

In the examples B1.8 to B 1.12, in forming the covering layer containing the nickel and the natural graphite powder by the electroless plating on the surface of the hydrogen absorbing alloy electrode fabricated in the same manner as the above-mentioned example B1, the amount of the natural graphite powder having the average particle diameter of 3 $\mu$m added to the plating fluid adopted in the above-mentioned example B1 was changed.

Specifically, the amount of the natural graphite powder in the plating fluid adopted in the above-mentioned example B1 per liter was respectively set to 0.02 g in the example B1.8; 0.05 g in the example B1.9; 0.15 g in the example B1.10; 0.40 g in the example B1.11; 0.50 g in the example B1.12.

The weight ratio of the natural graphite powder in each of the covering layers thus formed was respectively 0.2 wt % in the example B1.8; 0.5 wt % in the example B1.9; 2.0 wt % in the example B1.10; 5.0 wt % in the example B1.11; 5.5 wt % in the example B1.12 as shown in the following Table 7.

Except that each of the hydrogen absorbing alloy electrodes wherein each of the covering layers containing the nickel and the natural graphite powder were formed on the surface were employed as the negative electrode, each of the alkaline storage batteries in the examples B1.8 to B1.12 having the battery capacity of about 1 Ah which were in the shape of the cylinder were fabricated in the same manner as the above-mentioned example A1.

With respect to the alkaline storage batteries in the examples B1.8 to B1.12, the internal pressure, the internal resistance and the cycle life were measured in the same manner as that in the above-mentioned example A1. The results were shown in the following Table 7.

TABLE 7

|  | Amount of natural graphite in covering layer (wt %) | Internal pressure (kg/cm$^2$) | Internal resistance (m$\Omega$) | Cycle life (Number of times) |
|---|---|---|---|---|
| Example B1.8 | 0.2 | 14.2 | 22.3 | 685 |
| Example B1.9 | 0.5 | 12.8 | 21.2 | 742 |
| Example B1.10 | 2.0 | 12.5 | 21.5 | 799 |
| Example B1 | 3.5 | 11.5 | 21.9 | 820 |
| Example B1.11 | 5.0 | 11.3 | 22.2 | 785 |
| Example B1.12 | 5.5 | 13.0 | 23.2 | 654 |

As the result, in each of the alkaline storage batteries in the examples B1 and B1.9 to B1.11 wherein the weight ratio of the carbon particles composed of the natural graphite powder in the covering layer was in the range of 0.5 wt % to 5.0 wt %, the internal pressure and the internal resistance were decreased and the cycle life was improved compared with the alkaline storage batteries in the examples B1.8 and B1.12 wherein the weight ratio of the carbon particles composed of the natural graphite powder in the covering layer was respectively 0.2 wt % and 5.5 wt %.

Example C1

In the example C1, the hydrogen absorbing alloy powder represented by the constitutional formula of MmNi$_{3.2}$Co$_{1.0}$Al$_{0.6}$Mn$_{0.2}$ and having the average particle diameter of about 50 $\mu$m was used. In the hydrogen absorbing alloy powder, the misch metal represented by Mm was in the weight ratio of La:Ce:Pr:Nd=30:45:6:19.

In the example C1, the above-mentioned hydrogen absorbing alloy powder was immersed for 6 minutes in plating fluid wherein the temperature was 60° C., adjusted to pH 7 by ammonium hydroxide, and containing 30 g of the nickel sulfate, 34 g of the malonic sodium, 30 g of the boric acid, 30 g of the ammonium chloride, 3.4 g of the dimethylamine borane and 0.2 g of the polyethylene oxide (PEO) which was the hydrophilic polymer per liter for electroless plating and the covering layer containing nickel and polyethylene oxide (PEO) which was the hydrophilic polymer was formed on the surface of the above-mentioned hydrogen absorbing alloy powder.

The average thickness of a nickel part in the covering layer was about 1.0 $\mu$m, the weight of the covering layer to the hydrogen absorbing alloy powder before forming the covering layer was about 12 wt %, and the amount of polyethylene oxide (PEO) which was the hydrophilic polymer in the covering layer was about 3.5 wt %.

With respect to the current collector, the punching metal which was immersed for 6 minutes in the plating fluid adopted in the case of the above-mentioned hydrogen absorbing alloy powder for electroless plating, and wherein the covering layer containing the nickel and the polyethylene oxide (PEO) which was the hydrophilic polymer was formed on the surface was employed as the current collector. In the current collector, the average thickness of the nickel part in the covering layer was about 1.0 μm, and the amount of the polyethylene oxide (PEO) which was the hydrophilic polymer in the covering layer was about 3.5 wt %.

Then, 1.0 part by weight of the above-mentioned polyethylene oxide which was the hydrophilic polymer as the binding agent and a little water were mixed with 100 parts by weight of the hydrogen absorbing alloy powder wherein the covering layer containing the nickel and the polyethylene oxide which was the hydrophilic polymer was formed on the surface to prepare the paste, and the paste thus obtained was applied uniformly to both surfaces of the punching metal wherein the covering layer containing the nickel and the polyethylene oxide which was the hydrophilic polymer was formed on the surface, followed by drying. The punching metal having the paste applied thereto was then rolled, to obtain the hydrogen absorbing alloy electrode.

Except that the hydrogen absorbing alloy electrode thus fabricated was employed as the negative electrode, the alkaline storage battery in the example C1 having the battery capacity of about 1 Ah which was in the shape of the cylinder was fabricated in the same manner as the above-mentioned example A1.

Example C2

In the example C2, the same hydrogen absorbing alloy powder as that in the above-mentioned example C1 wherein the covering layer containing the nickel and the polyethylene oxide (PEO) which was the hydrophilic polymer was formed on the surface was employed.

With respect to the current collector, the polyethylene oxide which was the hydrophilic polymer was not added to the plating fluid adopted in the above-mentioned example C1. Except for the above, the same procedure of immersing the punching metal in the plating fluid for 6 minutes for electroless plating as the above-mentioned example C1 was taken to form the punching metal employed as the current collector wherein the covering layer which was composed only of the nickel and which did not contain the hydrophilic polymer was formed on the surface.

Except that the current collector wherein the covering layer which was composed only of the nickel and which did not contain the hydrophilic polymer was formed on the surface was employed, the hydrogen absorbing alloy electrode was fabricated in the same manner as the above-mentioned example C1.

Except that hydrogen absorbing alloy electrode thus fabricated was employed as the negative electrode, the alkaline storage battery in the example C2 having the battery capacity of about 1 Ah which was in the shape of the cylinder was fabricated in the same manner as the above-mentioned example A1.

Example C3

In the example C3, the same hydrogen absorbing alloy powder represented by the constitutional formula of $MmNi_{3.2}Co_{1.0}Al_{0.6}Mn_{0.2}$ and having the average particle diameter of about 50 μm as the above-mentioned example C1 was used.

In forming the covering layer on the surface of the hydrogen absorbing alloy powder, the polyethylene oxide which was the hydrophilic polymer was not added to the plating fluid adopted in the above-mentioned example C1. Except for the above, the same procedure as the above-mentioned example C1 was taken to form the covering layer composed only of the nickel and which did not contain the hydrophilic polymer on the surface of the hydrogen absorbing alloy particles.

With respect to the current collector, the punching metal wherein the covering layer containing the nickel and the polyethylene oxide (PEO) which was the hydrophilic polymer was formed on the surface was employed as the current collector in the same manner as the above-mentioned example C1.

Except that the above-mentioned hydrogen absorbing alloy powder wherein the covering layer which was composed only of the nickel and which did not contain the hydrophilic polymer was formed on the surface was used, the hydrogen absorbing alloy electrode was fabricated in the same manner as the above-mentioned example C1.

Except that hydrogen absorbing alloy electrode thus fabricated was employed as the negative electrode, the alkaline storage battery in the example C3 having the battery capacity of about 1 Ah which was in the shape of the cylinder was fabricated in the same manner as the above-mentioned example A1.

Example C4

In the example C4, the same hydrogen absorbing alloy powder represented by the constitutional formula of $MmNi_{3.2}Co_{1.0}Al_{0.6}Mn_{0.2}$ and having the average particle diameter of about 50 μm as the above-mentioned example C1 was used.

In the example C4, in forming the covering layer on the surface of the hydrogen absorbing alloy powder, the above-mentioned hydrogen absorbing alloy powder was immersed for 4 minutes in the plating fluid wherein the temperature was 90° C., adjusted to pH 9 by the ammonium hydroxide, and containing 15 g of the cobalt sulfate, 115 g of the sodium tartrate, 30 g of the boric acid, 21 g of the sodium hypophosphite and 0.2 g of the polyethylene oxide (PEO) which was the hydrophilic polymer for the electroless plating and the covering layer containing the cobalt and the polyethylene oxide (PEO) of hydrophilic polymer was formed on the surface of the above-mentioned hydrogen absorbing alloy powder.

The average thickness of the cobalt part in the covering layer was about 1.0 μm, the weight of the covering layer to the weight of the hydrogen absorbing alloy powder before the covering layer was formed was about 12 wt %, and the amount of polyethylene oxide (PEO) which was the hydrophilic polymer in the covering layer was about 3.5 wt %.

With respect to the current collector, the punching metal wherein the covering layer containing the nickel and the polyethylene oxide (PEO) which was the hydrophilic polymer was formed on the surface was employed as the current collector in the same manner as the above-mentioned example C1.

Except that the above-mentioned hydrogen absorbing alloy powder wherein the covering layer containing the cobalt and the polyethylene oxide (PEO) which was the hydrophilic polymer was formed on the surface was used, the hydrogen absorbing alloy electrode was fabricated in the same manner as the above-mentioned example C1.

Except that the hydrogen absorbing alloy electrode thus fabricated was employed as the negative electrode, the alkaline storage battery in the example C4 having the battery capacity of about 1 Ah which was in the shape of the cylinder was fabricated in the same manner as the above-mentioned example A1.

Comparative Example c1

In the comparative example c1, the same hydrogen absorbing alloy powder represented by the constitutional formula of $MmNi_{3.2}Co_{1.0}Al_{0.6}Mn_{0.2}$ and having the average particle diameter of about 50 μm as the above-mentioned example C1 was used.

In the comparative example c1, in forming the covering layer on the surface of the hydrogen absorbing alloy powder, the polyethylene oxide of hydrophilic polymer was not added to the plating fluid used in the above-mentioned example C1 to form the covering layer which was composed only of the nickel and which did not contain the hydrophilic polymer on the surface of the hydrogen absorbing alloy particles in the same manner as the above-mentioned example C3.

With respect to the current collector, the polyethylene oxide which was the hydrophilic polymer was not added to the plating fluid adopted in the above-mentioned example C1 to form the punching metal employed as the current collector wherein the covering layer which was composed only of the nickel and which did not contain the hydrophilic polymer was formed on the surface in the same manner as the above-mentioned example C2.

Except that the hydrogen absorbing alloy powder and the current collector wherein the covering layer which was composed only of the nickel and which did not contain the hydrophilic polymer was formed on the surface were used, the hydrogen absorbing alloy electrode was fabricated in the same manner as the above-mentioned example C1.

Except that hydrogen absorbing alloy electrode thus fabricated was employed as the negative electrode, the alkaline storage battery in the comparative example c1 having the battery capacity of about 1 Ah which was in the shape of the cylinder was fabricated in the same manner as the above-mentioned example A1.

Comparative Example c2

In the comparative example c2, the same hydrogen absorbing alloy powder represented by the constitutional formula of $MmNi_{3.2}Co_{1.0}Al_{0.6}Mn_{0.2}$ and having the average particle diameter of about 50 μm as the above-mentioned example C1 was used.

In the comparative example c2, in forming the covering layer on the surface of the hydrogen absorbing alloy powder, the polyethylene oxide which was the hydrophilic polymer was not added to the plating fluid adopted in the above-mentioned example C4 to form the covering layer which was composed only of the cobalt and which did not contain the hydrophilic polymer on the surface of the above-mentioned hydrogen absorbing alloy particles.

With respect to the current collector, the polyethylene oxide which was the hydrophilic polymer was not added to the plating fluid adopted in the above-mentioned example C1 to form the punching metal employed as the current collector wherein the covering layer which was composed only of the nickel and which did not contain the hydrophilic polymer was formed on the surface in the same manner as the above-mentioned example C2.

Except that the hydrogen absorbing alloy powder wherein the covering layer which was composed only of the cobalt and which did not contain the hydrophilic polymer was formed on the surface and the current collector wherein the covering layer which was composed only of the nickel and which did not contain the hydrophilic polymer was formed on the surface were used, the hydrogen absorbing alloy electrode was fabricated in the same manner as the above-mentioned example C1.

Except that hydrogen absorbing alloy electrode thus fabricated was employed as the negative electrode, the alkaline storage battery in the comparative example c2 having the battery capacity of about 1 Ah which was in the shape of the cylinder was fabricated in the same manner as the above-mentioned example A1.

Comparative Example c3

In the comparative example c3, the same hydrogen absorbing alloy powder represented by a constitutional formula of $MmNi_{3.2}Co_{1.0}Al_{0.6}Mn_{0.2}$ and having an average particle diameter of about 50 μm as the above-mentioned example C1 was used.

In the comparative example c3, in forming the covering layer on the surface of the hydrogen absorbing alloy powder, polytetrafluoroethylene (PTFE) which was water-repellent polymer was added to the plating fluid adopted in the above-mentioned example C1 in stead of the polyethylene oxide which was the hydrophilic polymer. Except for the above, the same procedure of the electroless plating as the above-mentioned example C1 was taken to form the covering layer composed of the nickel and the polytetrafluoroethylene (PTFE) which was the water-repellent polymer on the surface of the hydrogen absorbing alloy powder.

With respect to the current collector, the polyethylene oxide which was the hydrophilic polymer was not added to the plating fluid adopted in the above-mentioned example C1 to form the punching metal employed as the current collector wherein the covering layer which was composed only of the nickel and which did not contain the hydrophilic polymer was formed on the surface in the same manner as the above-mentioned example C2.

Except that the hydrogen absorbing alloy powder wherein the covering layer containing the nickel and the polytetrafluoroethylene (PTFE) which was the water-repellent polymer was formed on the surface and the current collector wherein the covering layer which was composed only of the nickel and which did not contain the hydrophilic polymer was formed on the surface were used, the hydrogen absorbing alloy electrode was fabricated in the same manner as the above-mentioned example C1.

Except that hydrogen absorbing alloy electrode thus fabricated was employed as the negative electrode, the alkaline storage battery in the comparative example c3 having the battery capacity of about 1 Ah which was in the shape of the cylinder was fabricated in the same manner as the above-mentioned example A1.

Comparative Example c4

In the comparative example c4, the same hydrogen absorbing alloy powder represented by the constitutional formula of $MmNi_{3.2}Co_{1.0}Al_{0.6}Mn_{0.2}$ and having the average particle diameter of about 50 μm as the above-mentioned example C1 was used. The covering layer was not formed on the surface of the hydrogen absorbing alloy powder.

With respect to the current collector, the polyethylene oxide which was the hydrophilic polymer was not added to the plating fluid adopted in the above-mentioned example C1 to form the punching metal employed as the current collector wherein the covering layer which was composed only of the nickel and which did not contain the hydrophilic polymer was formed on the surface in the same manner as the above-mentioned example C2.

Except that the hydrogen absorbing alloy powder wherein the covering layer was not formed on the surface and the current collector wherein the covering layer which was composed only of the nickel and which did not contain the hydrophilic polymer was formed on the surface were used, the hydrogen absorbing alloy electrode was fabricated in the same manner as the above-mentioned example C1.

Except that the hydrogen absorbing alloy electrode thus fabricated was employed as the negative electrode, the alkaline storage battery in the comparative example c4 having the battery capacity of about 1 Ah which was in the shape of the cylinder was fabricated in the same manner as the above-mentioned example A1.

With respect to the alkaline storage batteries in the examples C1 to C4 and the comparative examples c1 to c4, the internal resistance and the cycle life were measured in the same manner as the above-mentioned example A1. The results were shown in the following Table 8.

TABLE 8

|  | Covering layer material on surface of hydrogen absorbing alloy powder | Covering layer material on surface of current collector | Internal resistance (mΩ) | Cycle life (number of times) |
| --- | --- | --- | --- | --- |
| Example C1 | Ni + PEO | Ni + PEO | 22.1 | 824 |
| Example C2 | Ni + PEO | Ni | 22.7 | 658 |
| Example C3 | Ni | Ni + PEO | 23.0 | 668 |
| Example C4 | Co + PEO | Ni + PEO | 22.3 | 763 |
| Comparative example c1 | Ni | Ni | 23.7 | 595 |
| Comparative example c2 | Co | Ni | 23.5 | 551 |
| Comparative example c3 | Ni + PTFE | Ni | 24.5 | 611 |
| Comparative example c4 | — | Ni | 26.1 | 478 |

As apparent from the results, in each of the alkaline storage batteries in the examples C1 to C4 wherein the covering layers containing the nickel or cobalt and the polyethylene oxide (PEO) which was the hydrophilic polymer were formed on the surface of at least one of the hydrogen absorbing alloy powder and the current collector, the internal resistance was decreased and the cycle life was improved compared with each of the alkaline storage batteries in the comparative examples c1 and c2 wherein the covering layers which were composed only of the nickel or cobalt and which did not contain the hydrophilic polymer were formed on the surfaces of the hydrogen absorbing alloy powder and the current collector, the alkaline storage battery in the comparative example c3 wherein the covering layer containing the nickel and the polytetrafluoroethylene (PTFE) which was the water-repellent polymer was formed on the surface of the hydrogen absorbing alloy powder, and the alkaline storage battery in the comparative example c4 wherein the covering layer was not formed on the surface of the hydrogen absorbing alloy powder.

Especially in each of the alkaline storage batteries in the examples C1 and C4 wherein the covering layers containing the nickel or cobalt and the polyethylene oxide (PEO) which was the hydrophilic polymer were formed on the surfaces of the hydrogen absorbing alloy powder and the current collector, the internal resistance was further decreased and the cycle life was remarkably improved.

Examples C1.1 to C1.6

In the examples C1.1 to C1.6, in forming the covering layers containing the nickel and the polyethylene oxide (PEO) which was the hydrophilic polymer on the surface of the hydrogen absorbing alloy powder represented by the constitutional formula of $MmNi_{3.2}Co_{1.0}Al_{0.6}Mn_{0.2}$ and having the average particle diameter of about 50 μm by electroless plating, the time to immerse the above-mentioned hydrogen absorbing alloy powder in the above-mentioned plating fluid was changed.

Specifically, the immersion time was respectively set to 1 minute 48 seconds in the example C1.1; 3 minutes 00 second in the example C1.2; 9 minutes 00 second in the example C1.3; 12 minutes 00 second in the example C1.4; 15 minute 00 second in the example C1.5; 16 minute 12 seconds in the example C1.6.

The average thickness of nickel part in the covering layers containing the nickel and the polyethylene oxide (PEO) which was the hydrophilic polymer thus formed on the surface of the hydrogen absorbing powder was respectively 0.3 μm in the example C1.1; 0.5 μm in the example C1.2; 1.5 μm in the example C1.3; 2.0 μm in the example C1.4; 2.5 μm in the example C1.5; 2.7 μm in the example C1.6.

Except that each of the hydrogen absorbing alloy powder wherein the above-mentioned covering layers were formed was used, each of the hydrogen absorbing alloy electrodes were fabricated in the same manner as the above-mentioned example C1. Except that the hydrogen absorbing alloy electrodes thus fabricated were employed as the negative electrode, each of the alkaline storage batteries in the examples C1.1 to C1.6 having the battery capacity of about 1 Ah which were in the shape of the cylinder were fabricated in the same manner as the above-mentioned example A1.

With respect to the alkaline storage batteries in the examples C1.1 to C1.6, the internal resistance and the cycle life were measured in the same manner as the above-mentioned example A1. The results were shown in the following Table 9.

TABLE 9

|  | Covering layer on surface of hydrogen absorbing alloy powder | | Internal resistance (mΩ) | Cycle life (number of times) |
| --- | --- | --- | --- | --- |
|  | Material | Thickness of Ni part | | |
| Example C1.1 | Ni + PEO | 0.3 μm | 22.6 | 665 |
| Example C1.2 | Ni + PEO | 0.5 μm | 22.0 | 711 |
| Example C1 | Ni + PEO | 1.0 μm | 22.1 | 824 |
| Example C1.3 | Ni + PEO | 1.5 μm | 21.9 | 822 |
| Example C1.4 | Ni + PEO | 2.0 μm | 22.0 | 801 |
| Example C1.5 | Ni + PEO | 2.5 μm | 22.3 | 716 |
| Example C1.6 | Ni + PEO | 2.7 μm | 23.1 | 688 |

As apparent from the results, in the alkaline storage batteries employing the hydrogen absorbing alloy powder wherein the covering layers containing the nickel and the polyethylene oxide which was the hydrophilic polymer were formed on the surface, the internal resistance and the cycle life of the alkaline storage batteries in the examples C1 and C1.2 to C1.5 employing the hydrogen absorbing alloy powder wherein the average thickness of the nickel part in the covering layers was in the range of 0.5 μm to 2.5 μm were respectively decreased and improved. Especially, in each of the alkaline storage batteries in the examples C1, C1.3 and C1.4 employing the hydrogen absorbing alloy powder wherein the average thickness of the nickel part in the covering layers was in the range of 1 μm to 2 μm, the cycle life was remarkably increased.

With respect to the examples C1.1 to C1.6, in the hydrogen absorbing alloy powder wherein the covering layers containing the nickel and the polyethylene oxide which was the hydrophilic polymer were formed on the surface, the average thickness of the nickel part in the covering layers was changed. The same results were obtained in the alkaline storage battery in the example C3 employing the hydrogen absorbing alloy powder wherein the covering layer containing the cobalt and the polyethylene oxide which was the hydrophilic polymer was formed on the surface.

Examples C1.7 to C1.11

In the examples C1.7 to C1.11, in forming the covering layers containing the nickel and the polyethylene oxide (PEO) of hydrophilic polymer on the surface of the hydrogen absorbing alloy powder represented by the constitutional formula of $MmNi_{3.2}Co_{1.0}Al_{0.6}Mn_{0.2}$ and having the average particle diameter of about 50 μm by electroless plating in the same manner as the above-mentioned example C1, the amount of the polyethylene oxide which was the hydrophilic polymer contained in the above-mentioned plating fluid was changed.

Except that the amount of the polyethylene oxide in the plating fluid per liter was respectively set to 0.02 g in the example C1.7; 0.05 g in the example C1.8; 0.15 g in the example C1.9; 0.4 g in the example C1.10; 0.5 g in the example C1.11, the covering layers containing the nickel and the polyethylene oxide which was the hydrophilic polymer were formed on the surface of the hydrogen absorbing alloy powder in the same manner as the above-mentioned example C1.

The amount of the polyethylene oxide (PEO) which was the hydrophilic polymer in the covering layers was respectively 0.2 wt % in the example C1.7; 0.5 wt % in the example C1.8; 2.0 wt % in the example C1.9; 5.0 wt % in the example C1.10; 5.5 wt % in the example C1.11 as shown in the following Table 10 in the case wherein the covering layers containing the nickel and the polyethylene oxide (PEO) which was the hydrophilic polymer were formed on the surface of the hydrogen absorbing alloy powder as mentioned above.

Except that each of the hydrogen absorbing alloy powder wherein the above-mentioned covering layers were formed was used, each of the hydrogen absorbing alloy electrodes were fabricated in the same manner as the above-mentioned example C1. Except that the hydrogen absorbing alloy electrodes thus fabricated were employed as the negative electrode, each of the alkaline storage batteries in the examples C1.7 to C1.11 having the battery capacity of about 1 Ah which were in the shape of the cylinder were fabricated in the same manner as the above-mentioned example A1.

With respect to the alkaline storage batteries in the examples C1.7 to C1.11, the internal resistance and the cycle life were measured in the same manner as the above-mentioned example A1. The results were shown in the following Table 10.

TABLE 10

| | Covering layer on surface of hydrogen absorbing alloy powder | | Internal resistance (mΩ) | Cycle life (number of times) |
|---|---|---|---|---|
| | Material | Content by weight of PEO (wt %) | | |
| Example C1.7 | Ni + PEO | 0.2 | 23.0 | 653 |
| Example C1.8 | Ni + PEO | 0.5 | 22.4 | 750 |
| Example C1.9 | Ni + PEO | 2.0 | 22.2 | 807 |
| Example C1 | Ni + PEO | 3.5 | 22.1 | 824 |
| Example C1.10 | Ni + PEO | 5.0 | 22.5 | 759 |
| Example C1.11 | Ni + PEO | 5.5 | 22.9 | 661 |

As apparent from the results, in the alkaline storage batteries employing the hydrogen absorbing alloy powder wherein the covering layers containing the nickel and the polyethylene oxide which was the hydrophilic polymer was formed on the surface, the internal resistance and the cycle life of the alkaline storage batteries in the examples C1 and C1.8 to C1.10 employing the hydrogen absorbing alloy powder wherein the amount of the polyethylene oxide (PEO) which was the hydrophilic polymer in the above-mentioned covering layer was in the range of 0.5 wt % to 5.0 wt % were respectively further decreased and improved. Especially, in each of the alkaline storage batteries in the examples C1 and C1.9 employing the hydrogen absorbing alloy powder wherein the amount of the polyethylene oxide (PEO) which was the hydrophilic polymer in the covering layers was in the range of 2.0 wt % to 3.5 wt %, the internal resistance was further decreased and the cycle life was remarkably improved.

With respect to the examples C1.7 to C1.11, in the hydrogen absorbing alloy powder wherein the covering layers containing the nickel and the polyethylene oxide which was the hydrophilic polymer were formed on the surface, the amount of the polyethylene oxide which was the hydrophilic polymer in the covering layer was changed. The same results were obtained in the alkaline storage battery in the example C3 employing the hydrogen absorbing alloy powder wherein the covering layer containing the cobalt and the polyethylene oxide which was the hydrophilic polymer was formed on the surface.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A hydrogen absorbing alloy for electrode containing hydrogen absorbing alloy particles, wherein
a covering layer is formed on a surface of said hydrogen absorbing alloy particles, and wherein
said covering layer contains carbon particles and at least one metal elected from nickel and cobalt.

2. The hydrogen absorbing alloy for electrode according to claim 1, wherein
said covering layer is formed by plating.

3. The hydrogen absorbing alloy for electrode according to claim 1, wherein
said at least one metal forms a layer having a thickness, and further wherein an average thickness of said at least one metal in said covering layer is in the range of 0.5 μm to 2.5 μm.

4. The hydrogen absorbing alloy for electrode according to claim 1, wherein
an amount of the carbon particles in said covering layer is in the range of 0.5 wt % to 5.0 wt %.

5. The hydrogen absorbing alloy for electrode according to claim 1, wherein
said at least one metal forms a layer having a thickness, and further wherein an average particle diameter of said carbon particles in said covering layer is not less than the average thickness of said at least one metal.

6. A hydrogen absorbing alloy electrode in which an electrode material containing hydrogen absorbing alloy particles is adhered to a current collector, wherein
a covering layer is formed on a surface of said hydrogen absorbing alloy particles, and wherein
said covering layer contains carbon particle and at least one metal elected from nickel and cobalt.

7. An alkaline storage battery employing as its negative electrode the hydrogen absorbing alloy electrode according to claim 6.

8. A hydrogen absorbing alloy electrode in which an electrode material containing hydrogen absorbing alloy particles is adhered to a current collector, wherein
a covering layer containing at least one of metal elected from nickel and cobalt, and carbon particles is formed on a surface of the electrode.

9. The hydrogen absorbing alloy electrode according to claim 8, wherein
said covering layer is formed by plating.

10. The hydrogen absorbing alloy electrode according to claim 8, wherein
an average thickness of said metal part in said covering layer is in the range of 0.5 $\mu$m to 5.0 $\mu$m.

11. The hydrogen absorbing alloy electrode according to claim 8, wherein
an amount of the carbon particles in said covering layer is in the range of 0.5 wt % to 5.0 wt %.

12. An alkaline storage battery employing as its negative electrode the hydrogen absorbing alloy electrode according to claim 8.

13. A hydrogen absorbing alloy for electrode containing hydrogen absorbing alloy particles wherein
a covering layer is formed on a surface of said hydrogen absorbing alloy particles, and wherein
said covering layer contains hydrophilic polymer and at least one metal elected from nickel and cobalt.

14. The hydrogen absorbing alloy for electrode according to claim 13, wherein
a thickness of the metal part containing at least one of the metal elected from nickel and cobalt in said covering layer is in the range of 0.5 $\mu$m to 2.5 $\mu$m.

15. The hydrogen absorbing alloy for electrode according to claim 13, wherein
a content by amount of the hydrophilic polymer in said covering layer is in the range of 0.5 wt % to 5.0 wt %.

16. A hydrogen absorbing alloy electrode in which an electrode material containing hydrogen absorbing alloy particles is adhered to a current collector, wherein
a covering layer is formed on a surface of said hydrogen absorbing alloy particles, and wherein
said covering layer contains hydrophilic polymer and at least one metal elected from nickel and cobalt.

17. An alkaline storage battery employing as its negative electrode the hydrogen absorbing alloy electrode according to claim 16.

18. A hydrogen absorbing alloy electrode in which an electrode material containing hydrogen absorbing alloy particles is adhered to a current collector, wherein
a covering layer is formed on a surface of said current collector, and wherein
said covering layer contains hydrophilic polymer and at least one metal elected from nickel and cobalt.

19. The hydrogen absorbing alloy electrode according to claim 18, wherein
a second covering layer containing hydrophilic polymer and at least one metal elected from nickel and cobalt is formed on the surface of said hydrogen absorbing alloy particles.

20. The hydrogen absorbing alloy electrode according to claim 18, wherein the electrode material is adhered to the current collector by a binding agent, and wherein said binding agent is equivalent to the hydrophilic polymer in said covering layer.

21. An alkaline storage battery employing as its negative electrode the hydrogen absorbing alloy electrode according to claim 18.

* * * * *